(12) United States Patent
Nakai

(10) Patent No.: US 8,043,147 B2
(45) Date of Patent: Oct. 25, 2011

(54) VITREOUS SYSTEM

(75) Inventor: Akihiro Nakai, Sasayama (JP)

(73) Assignee: Nakai Komuten Co., Ltd., Hyogo (JP)

( * ) Notice: Subject to any disclaimer, the term of this patent is extended or adjusted under 35 U.S.C. 154(b) by 1161 days.

(21) Appl. No.: 11/765,535

(22) Filed: Jun. 20, 2007

(65) Prior Publication Data

US 2008/0201888 A1 Aug. 28, 2008

(30) Foreign Application Priority Data

Feb. 28, 2007 (JP) .................................. 2007-048243

(51) Int. Cl.
*B60S 1/54* (2006.01)
(52) U.S. Cl. ....................................................... 454/122
(58) Field of Classification Search .................... 454/122
See application file for complete search history.

(56) References Cited

FOREIGN PATENT DOCUMENTS

| JP | 06-227250 | 8/1994 |
|---|---|---|
| JP | 07-040806 | 2/1995 |
| JP | 2002-079919 | 3/2002 |
| JP | 2003-118546 | 4/2003 |
| JP | 2005-060141 | 3/2005 |

*Primary Examiner* — Steve McAllister
*Assistant Examiner* — Kosanovic Helena
(74) *Attorney, Agent, or Firm* — Antonelli, Terry, Stout & Kraus, LLP.

(57) ABSTRACT

A vitreous system of the invention is provided for use particularly as windowpanes of a car or the like vehicle, and is always kept clean over its whole surface. A multi-layer vitreous body 'A' forming the system is composed of an outside glass plate (1), an inside glass plate (2) and a stratified air space (3) defined between the inside and outside plates. A number of jetting orifices (1a) are formed to penetrate the outside plate (1), and a compressor (5) is connected through a piping (4) to the air space (3) so as to charge it with a compressed air, so that this air is blown out through the orifices (1a).

6 Claims, 4 Drawing Sheets

VITREOUS SYSTEM

FIELD OF THE INVENTION

The present invention relates to a vitreous system comprising glass plates and functioning to cleanse the external face (exposed to the exterior of any vehicle or building) of either glass plate to be free from rainwater, snow, condensed dew and/or blurring moisture. This system may preferably be used as the front glasses, rear glasses or other windowpanes of vehicles, the side mirrors thereof, windowpanes in buildings, or the like.

BACKGROUND ART

Heretofore, monolithic glass plates have been used as the windowpanes of vehicles. The inner face of a vehicle windowpane has to be protected from burring, and the air-heating and air-cooling efficiency of the vehicle interior is to be improved. Therefore, a certain proposal was made to use a double-layer window glass (exemplified in Patent Reference 1, listed below). According to this proposal, two glass plates are fixed one on another, with a hollow space being defined between them.

The outer face of a vehicle windowpane is exposed to the outside, and consequently more prone to become dirty. Whether the glass plates are of a single-layer or double-layer structure, the outer glass faces exposed to the exterior of vehicles have been cleaned using motor-driven and mechanical rubber wipers.

Instead of using such motor-driven rubber wipers, air wipers of some types (see Patent References 2 and 3) were proposed for use to clean up the outer glass faces exposed to the exterior of vehicles.

A driving mechanism such as those used to rotate the mechanical wipers can be dispensed with in the air wipers, thereby rendering them simpler in structure. The air wipers do not require replacement of torn-off wiping elements, contrary to a case wherein the mechanical rubber wipers are employed. Any element of each air wiper is not kept in contact with the glass plate surface and does not repeat reciprocation. Thus, this glass face will be protected from being scratched. Any washing liquid (i.e., detergent solution) that has been inevitable to the rubber wipers is no longer necessary. Such air wipers are less likely to cause environmental pollution.

However, jet nozzles for blowing off a highly compressed air should be disposed at peripheral zones (particular, near a lower edge) of the front glass, rear glass or the like. Due to such a requirement for ensuring a good sight, an area which the compressed air jet can wipe is limited to a narrow region located near the jet nozzle. In other words, the air wiper can not necessarily wipe uniformly over the entire surface of a windowpane.

In another proposal (see Patent Reference 4) made to more widely wipe a windowpane, a number of air jet holes are formed in a wiper body. This body is driven to reciprocate on and along the outer surface of a windowpane. Air is jet out through the holes towards said surface so as to blow off rainwater or the like.

Further, some multilayer glass plates have been proposed (as exemplified in Patent Reference 5) for use as buildings' windowpanes and for example for the purpose of providing an adiabatic effect.

Also in case of the buildings' windowpanes, their outer surfaces exposed to the outside are prone to rapidly become dirty. Such outer surfaces have been cleaned almost by hand.

Patent Reference 1: Patent Laying-Open Gazette No. 6-227250
Patent Reference 2: ibid. No. 07-040806
Patent Reference 3: ibid. No. 2002-79919
Patent Reference 4: ibid. No. 2003-118546
Patent Reference 5: ibid. No. 2005-060141

DISCLOSURE OF THE INVENTION

Problems to be Solved and Objects to be Achieved

As discussed above, air wipers were proposed to clean up vehicle windowpanes (particularly front and rear glasses). Nozzles of such wipers will be disposed near lower edges of the front glasses (as disclosed in Patent References 2 and 3). The sight through the front glass will thus be ensured, and those nozzles consequently reduce the area of glass surfaces that can be cleansed using the air wipers.

There may be another case wherein an air wiper is attached to a conventional wiper assembly (see Patent Reference 4). Such air wiper will mechanically swivel in contact with the outer surface of each windowpane. However, a complicated driving mechanism is necessary to feed a compressed air to the movable air wiper. In addition, such an air wiper will necessitate maintenance works, checking and/or repairing works. Also in this case, in spite of the air wiper thus driven, a cleansable area does not extend all over the whole surface of a glass surface. This area is constricted to a region in which said wiping member will swivel. Further, an unpleasant noise is likely to be made due to the rotating drive mechanism or the blowing of air out of such a wiper body.

Air wipers can neither remove frost away from the outer face of any windowpane, nor clean up any blur appearing on the windowpane inner surface.

With respect to buildings, their windowpanes whose outer surfaces have been cleaned by hand should not become dirty so rapidly as to cost much labor. It is desirable that any windowpanes having gotten smudged can be cleansed readily and easily.

Multistoried buildings including high-rise apartment or condominium buildings do usually have windowpanes positioned at such an elevation as causing acrophobia. Therefore, it also is desired to diminish frequency of dangerous manual works to cleanse the outer surfaces of those windowpanes.

The present invention addresses itself to these problems and requirements inherent in vehicles and buildings. An object of the present invention is thus to provide a novel vitreous system, that may comprise an improved glass plate. The external side of this glass plate exposed to the outside should not be apt to become dirty but be easier to cleanse, even if smudged.

Another object is to provide a vitreous system used as the front or rear glass of a vehicle and capable of automatically removing rainwater or snow that has stuck to the entire surface of its glass plate. Such a cleansing effect has to be ensured without aid of any prior art driving mechanism as employed in the known rubber or air wipers. At the same time, this vitreous system should not allow rainwater and snow to readily stick to its glass plate.

A further object is to provide a vitreous system whose glass plate is protected by nature from readily blurring due to moisture, and can be cleared instantly once and if it blurs occasionally.

A still further object is to provide a vitreous system such that any washing liquid (viz., detergent solution) is not indispensable, but can reduce frequency of occasionally using the liquid.

A yet still further object is to provide a vitreous system that may be used as the windowpane of a building such that its external surface is protected well from being rapidly smudged. It should be able to remove rainwater or snow that will have occasionally and temporarily stuck to said external surface.

SUMMARY OF THE INVENTION

In order to achieve the objects, the invention proposes a vitreous system comprising an inside glass plate and an outside glass plate perforated to have a number of jetting orifices formed therein. A stratified air space is defined between the inside and outside plates, and has a periphery sealed to constitute a multilayer vitreous body. A compressor for charging the air space with a compressed air is connected to the vitreous body. In operation, the compressed air in the space will be compelled to blow out through the orifices.

The jetting orifices formed in the perforated outside glass plate are dimensioned such that the compressed air can flow out of the air space, but surface tension of rainwater will prevent it from entering the air space through the orifices. The jetting orifices are sized small enough or almost invisible, thus ensuring a good view through a vehicle front glass or the like glass plate. However, the sight through the glass plates are not of vital importance if buildings' windowpanes (for example, frosted glass plates) are concerned. It will not be necessary to remarkably reduce the size of those orifices in this case, insofar as they inhibit rainwater, dust or any other obstacle particles from permeating the glass plate into the air space.

According to the invention, the number of fine orifices formed in the outside glass plate serve to jet out the compressed air fed from the compressor. Rainwater or the like will be repelled away from the external surface of said glass plate. In addition, a thin and fluid outer layer of jetted effluent air will appear on and along the external surface. It will be difficult for those rain drops, dust or other obstacle particles to adhere to the external surface of glass plate. Such air jetting orifices distributed from end to end of the glass plate are effective to cleanse and keep clear the whole surface thereof.

Since any movable drive does not accompany the wiping mechanism of the present vitreous system, it scarcely gets out of order to require maintenance works and replacement of parts.

The cleansing of glass plates without use of a washing liquid, or with use thereof at considerably prolonged periods, is beneficial to protection of environment.

The present vitreous system may further comprise a water-repellent and air-permeable membrane formed on and covering an outer surface of the outside glass plate.

Such a membrane will make it more difficult for rainwater to permeate the glass plate.

The vitreous system may further comprise an air conditioner connected to the compressor so as to feed thereto a conditioned air.

In this case, the compressor will be supplied with a cooled or heated air, which is then delivered to the air space to thereby facilitate the air conditioning of a cabin or room. A properly hot air fed to the space will be useful to prevent the blurring of or dew condensation on the inner surface of vitreous body. This condition is also effective to remove snow or frost from the outer surface of the vitreous body.

The air conditioner for the vitreous system may be connected through a change-over valve to the compressor, whereby one of the conditioned air and an ambient atmospheric air can selectively be supplied to said compressor.

If any hot air is not needed in such a case, then the air conditioner will be turned off to simply feed an ambient air and thereby reduce energy consumption.

The multilayer vitreous body constituting the vitreous system may serve as a windowpane built in a structural object, that is vehicles and buildings.

The vehicles include, in addition to automobile cars, certain railroad vehicles such as electric trains, various airplanes, ships and boats. The buildings include individual houses, aggregated houses (such as condominiums or apartments), and office buildings.

THE PREFERRED EMBODIMENTS

Some embodiments that will now be described referring to the accompanying drawings do not limit the present invention, but may be modified in various manners and fashions within a scope thereof.

Figure 1:
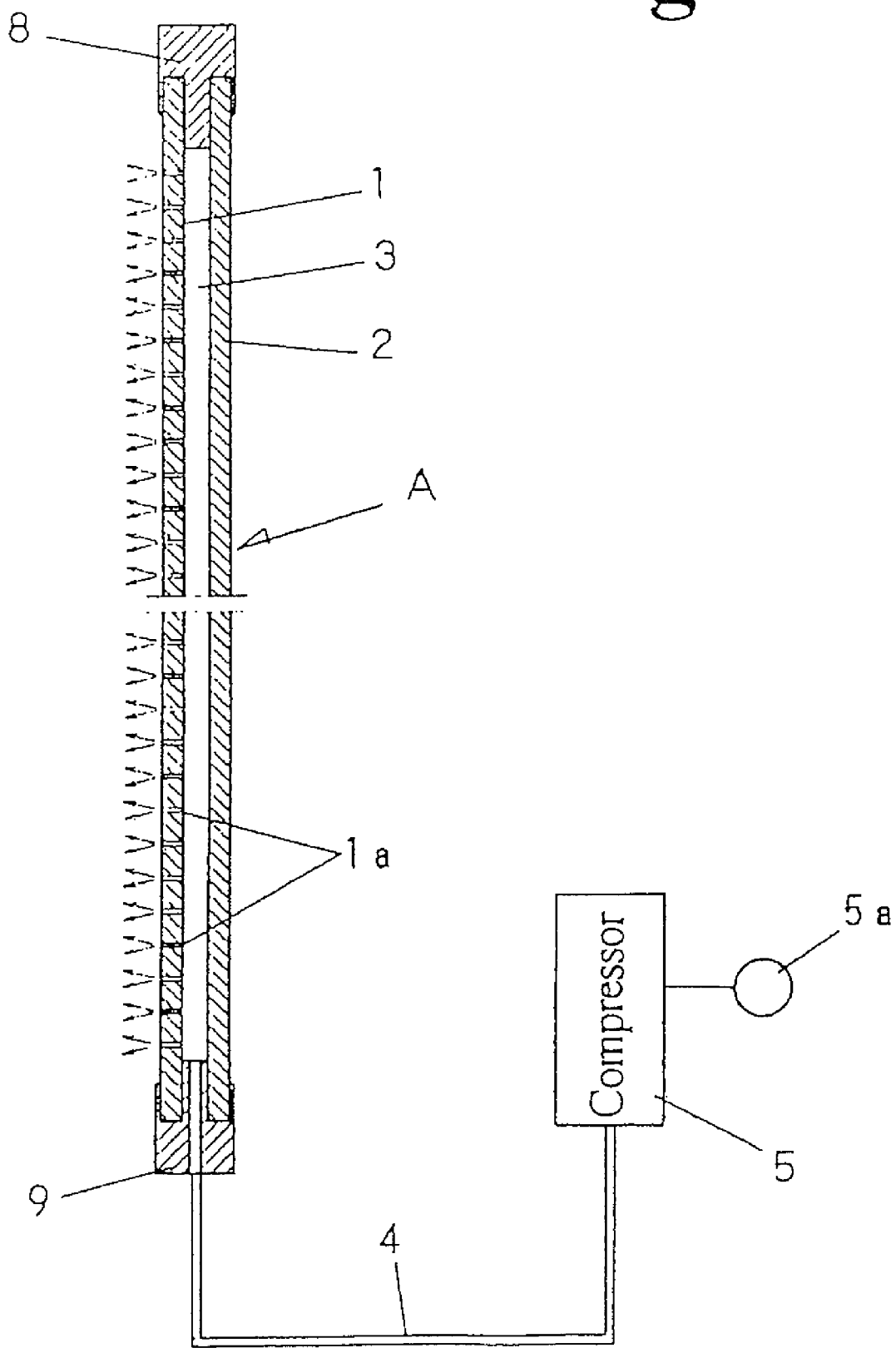
FIG. 1 is the scheme of a vitreous system provided in a first embodiment of the present invention, partly shown in cross section.

FIG. 1 illustrates partly in cross section a basic structure of the vitreous system of the invention. A laminated or multilayer vitreous body 'A' is composed of a transparent and perforated outside glass plate 1, and a transparent inside glass plate 2. A stratified air space 3 is defined between the outside and inside plates 1 and 2. A number of fine jetting orifices 1a formed in the outside glass plate 1 are distributed all over the surface thereof. The air space 3 intervening between those plates has a periphery that is completely sealed with a framework 8. A joint 9 is secured to a hem portion of the vitreous body and connected to a piping 4. This piping extending from a compressor 5 is in fluid communication with the air space 3 between the glass plates.

The jetting orifices 1a of the outside glass plate 1 have such a diameter that the compressed air can easily blow outwards. However, due to surface tension, any amount of water can not permeate said plate inwards into the air space. Laser beam treatment may be conducted to pierce in the plate certain orifices 1a that are not so extremely fine but have a diameter of several tens of microns (μm). Alternatively, ion beam treatment may be applied to a raw glass plate so as to form much finer orifices. These orifices 1a are scattered uniformly all over the outside glass plate 1, at regular intervals. By virtue of this feature, rainwater having fallen onto the external surface of this plate 1 will be blown off completely and smoothly. The compressed air supplied from the compressor 5 and jetting out through said orifices 1a will effectively and uniformly cleanse the said external surface of glass plate. A control panel 5a associated with the compressor 5 will operate to regulate the pressure of compressed and jetted air, in order to adjust the load applied to compressor in response to the rainfall intensity.

Figure 2:
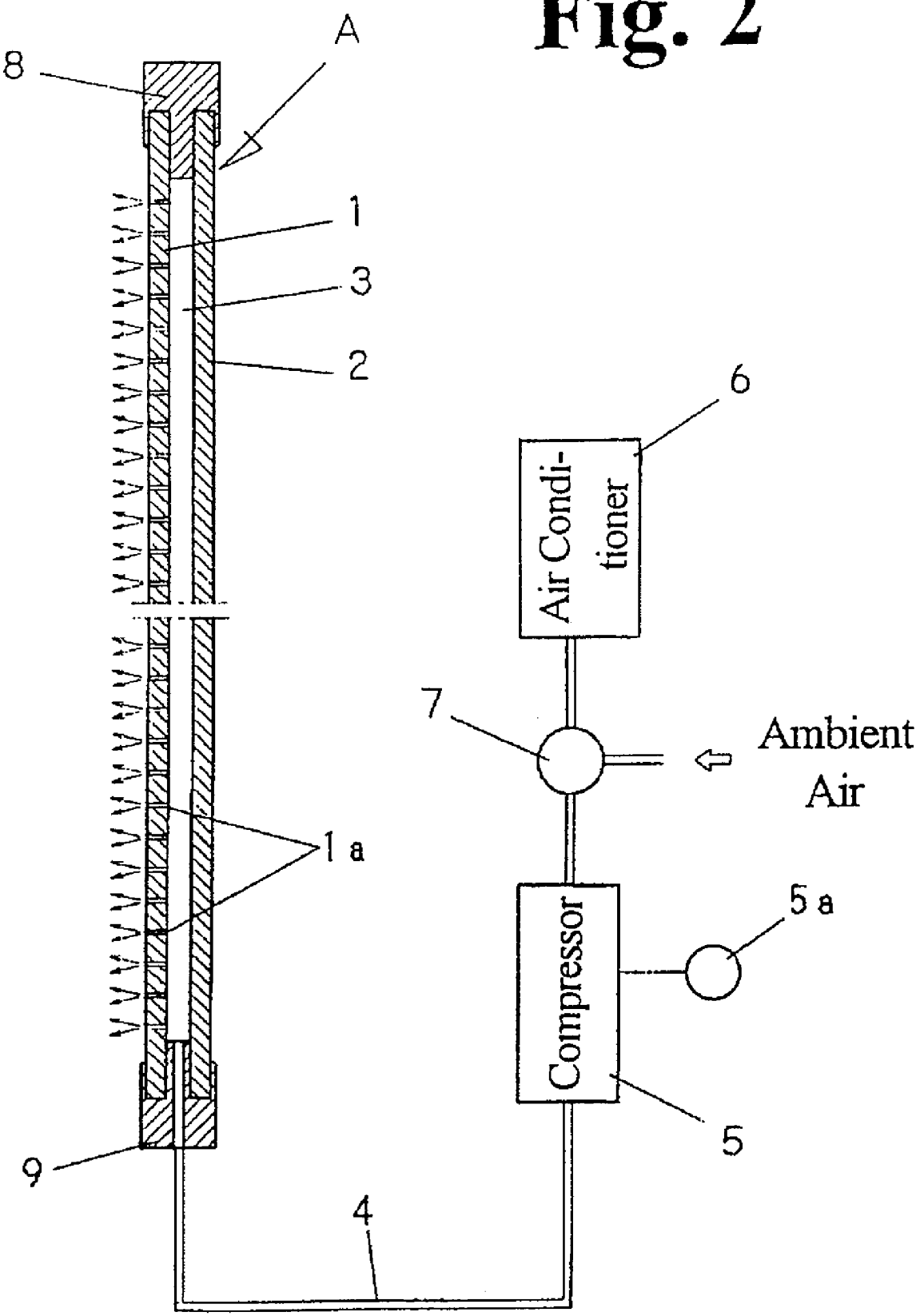
FIG. 2 is the scheme of a vitreous system provided in another embodiment.

FIG. 2 shows another embodiment, wherein an air conditioner 6 is operatively connected to the air compressor 5 so that a conditioned air is fed thereto.

A hot or warm air from the conditioner 6 will be conveniently compressed in the compressor 5, before delivered to the air space 3 in multilayer vitreous body 'A'. Thus, dew that will have condensed on the outer glass plate 1, as well as snow that may tend to lie thereon, are eliminated in a short time. Any blur on the surface of inside glass plate 2 will also disappear rapidly.

Temperature of the interior (viz., the space inside a vehicle or room) may be controlled with aid of the air conditioner 6. In this case, a hot or cold air supplied to the air space 3 will improve the efficiency of air conditioning for said interior.

It may be possible to interpose a change-over valve 7 between the air conditioner 6 and compressor 5. This feature is advantageous in that with the valve 7 being operated, the compressor 5 will selectively suck either the air from the conditioner or an ambient atmospheric air. If any hot or warm air is not needed, then the conditioner 6 will not be turned on. Thus, the ambient air is simply supplied to the compressor to thereby reduce energy consumption.

Figure 3:
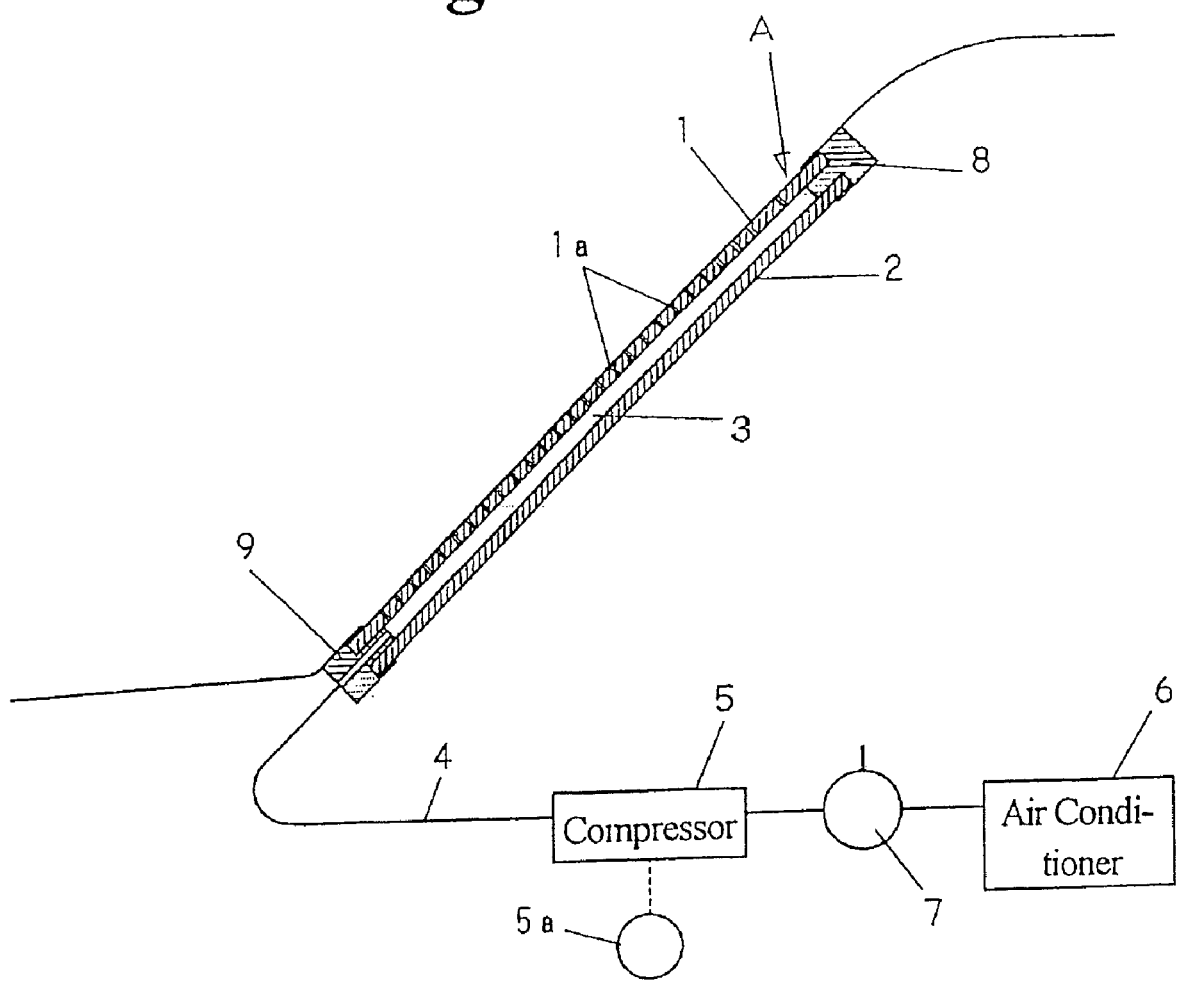
FIG. 3 is the scheme of the vitreous system of the invention applied to an automobile car so as to serve as a window glass.

In a further embodiment of FIG. 3, the vitreous system is applied to a front glass of an automobile car, and the same basic structure as shown in FIG. 2 is employed. Any air conditioning apparatus pre-installed and existing in this car may work as the air conditioner 6 in this case. Only a small compressor need be added, thereby rendering inexpensive the vitreous system of the invention.

The present vitreous system may be used not only as the window glasses of a car. It is applicable also to any of railroad trains, boats or ships, airplanes and the like, or used as buildings' windowpanes.

In a case wherein the system is employed as the car window glasses, the latter are not limited to the front and rear ones but may be the side windows.

Figure 4:
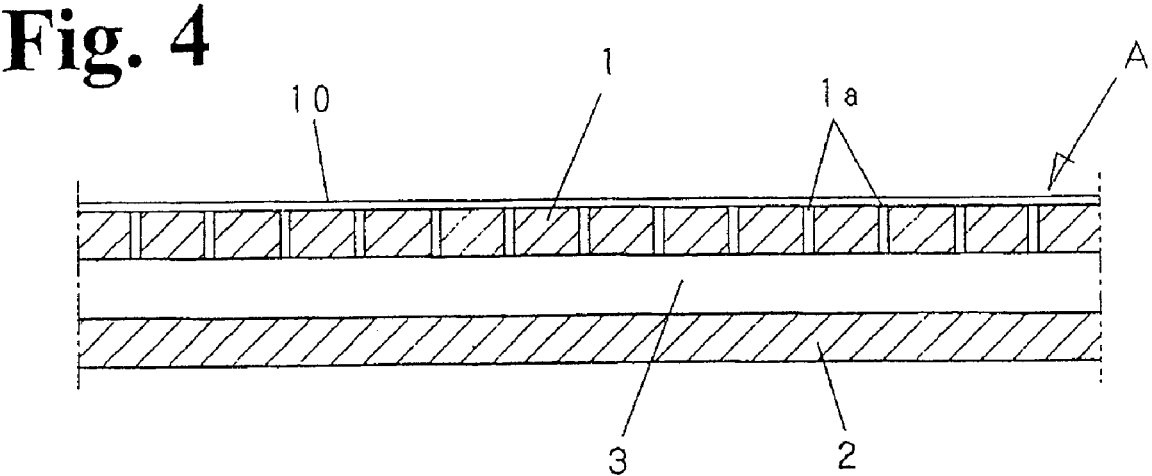
FIG. 4 is the scheme of a multilayer vitreous body in a further embodiment of the invention.

The foregoing embodiment may be modified in any desired manner or fashion, for example as shown in FIG. 4. The outer surface of outside glass plate 1 of multilayer vitreous body 'A' may be coated with a transparent membrane 10, using for example a product called "Nano-coat" (trademark of the product of Nikko Co., Ltd.). This feature is advantageous in that the membrane will permit the compressed air to blow outwards, and consequently repel the water tending to stick to the outer surface, thus preventing any water from entering the air space.

Figure 5:
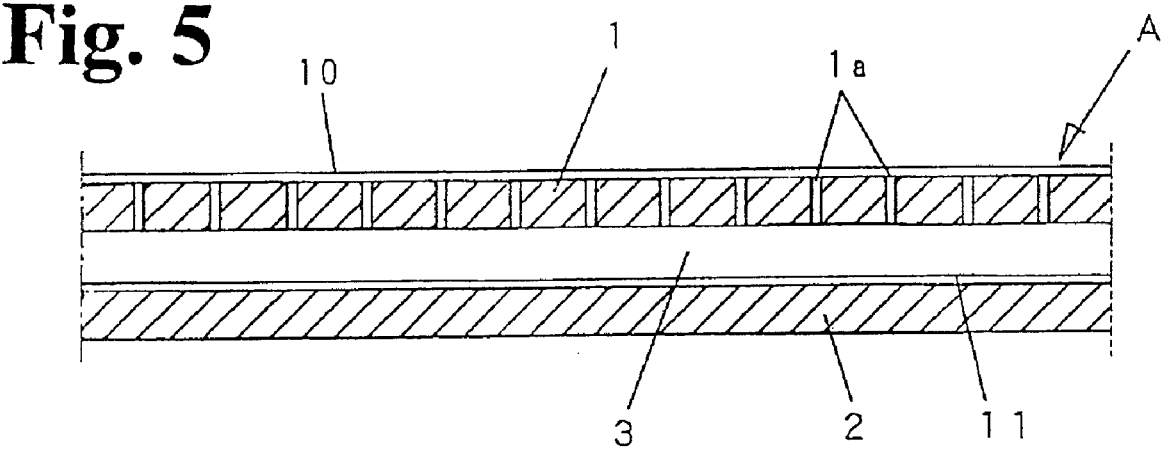
FIG. 5 is the scheme of a multilayer vitreous body provided in a still further embodiment.

FIG. 5 illustrates a still further embodiment, wherein a reflective membrane 11 (e.g., metallic layer produced by vapor deposition) covers either side of the inside glass plate 2 of the vitreous body 'A'. This membrane may preferably be formed on the inside plate surface in contact with the stratified air space 3, or alternatively on the other surface opposite to this space. Such a vitreous system will be useful as a side mirror of any desired vehicle.

The invention claimed is:

1. Vitreous system comprising:
   an inside glass plate,
   an outside glass plate perforated to have a number of jetting orifices formed therein,
   a stratified air space defined between the inside and outside glass plates facing one another,
   the air space having a periphery completely sealed so as to constitute together with the glass plates a multilayer vitreous body,
   a compressor for charging the air space with a compressed air,
   whereby in operation the compressed air supplied to the air space is compelled to blow out through the orifices.

2. Vitreous system as defined in claim 1, further comprising a water repellent and air permeable membrane formed on and covering an outer surface of the outside glass plate.

3. Vitreous system as defined in claim 1, further comprising an air conditioner connected to the compressor so as to feed thereto a conditioned air from the conditioner.

4. Vitreous system as defined in claim 3, wherein the air conditioner is connected through a change-over valve to the compressor such that one of the conditioned air and an ambient atmospheric air is selectively supplied to said compressor.

5. Vitreous system as defined in claim 1, wherein the multilayer vitreous body is designed to serve as a window glass that is built in a structural object selected from the group consisting of vehicles and buildings.

6. Vitreous system as defined in claim 1, further comprising a reflective membrane formed on and covering either side face of the inside glass plate, whereby the multilayer vitreous body is capable of serving as a side mirror of a vehicle.

* * * * *